Sept. 25, 1928.

M. TANZI 1,685,249

MACARONI DIE

Filed Jan. 23, 1928

Inventor:
Mario Tanzi
by Nathan B. Day
Attorney

Patented Sept. 25, 1928.

1,685,249

UNITED STATES PATENT OFFICE.

MARIO TANZI, OF BOSTON, MASSACHUSETTS.

MACARONI DIE.

Application filed January 23, 1928. Serial No. 248,855.

This invention relates to machinery for the manufacture from plastic dough of food products such as macaroni and the like, and more particularly relates to the means employed therein for giving a characteristic shape or structure to said products.

Said products are generally made by the agency of a dough press, which in one of its common forms comprises a cylinder for containing the dough in a plastic condition and means for exerting pressure on said dough so that it is caused to be expelled through apertures or dies formed in a die plate located at the discharging end of said cylinder. Inasmuch as said machinery and the dough press are well known in the art, I have not shown nor described the same at length in the drawings and specification of this application.

My invention more particularly pertains to the construction of the dies or dough discharging apertures formed in the die plates through which the dough in said machines is expelled from the dough presses. As is well known in the art, said die plates are of a size adapted to close the end of the dough press cylinder, and in said die plate are formed a plurality of dies which are distributed over the die plate in such numbers as the form and nature of the die and the relative area required in the die plate for the same permit.

The object of my invention is to provide a novel construction of the die which shapes the dough forced there through from the dough-press into a macaroni or other like product having the distinctive characteristics which are hereinafter set forth; which macaronis are designated by the trade name "Juliet".

As my invention, as above mentioned relates wholly to the dies used in shaping the macaroni, I have in this application confined the drawings and specification to the illustration and description of the characteristic construction and formation of a single die. It is to be understood, however, that such die is but one among a plurality of other like dies formed in said die plate, all of which have the construction and formation characteristic of said single die. My invention, therefore, consists in a die for the purpose heretofore stated having the novel features of construction and the combination of elements hereinafter described, particularly pointed out in the claims, and shown in the accompanying drawings.

In said drawings, in which like reference characters, so far as practicable, designate the corresponding parts in the several views.

Figure 1:
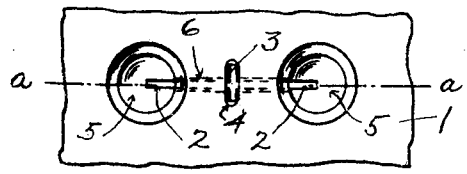
Fig. 1 is a fragment of the die plate, viewed toward the dough entering side thereof, and showing located therein a single die embodying my invention in its preferred form.

In said drawings 1 is a fragment of the die plate showing a single die constructed therein. The discharge aperture of the die, in its preferred construction is in the form of a cruciform opening comprising a narrow longitudinal slot 2, which is crossed substantially midway of its length in the short cross slot 3. A channel 4 of an area approximately equivalent to that of the short cross slot 3 extends through the die plate 1, from its intake side, (meaning thereby the side thereof against which the dough from the dough press is forced) and leads to and terminates in the portion of said aperture formed by said cross slot.

Die feeding apertures or recesses 5, 5, which may be formed by drilling from the intake side of the die plate, traverse substantially the thickness of the plate, with the apex of one such recess located over one end of the longitudinal slot 2 and with the apex of the other recess portioned over the other end of said slot.

A passage, 6, extends laterally from each of said die feeding apertures and is carried downwardly to, and terminates in the portion of the longitudinal slot 2 lying intermediate an end and the cross slot 3. Said passage 6, is also arranged to extend to and communicates with the adjacent side of the channel 4. While in the drawings I have for the sake of clarity shown said passage 6, 6, as of greater width than that of the slot 2 and 3 embodied in the discharge orifice, the widths of said passages 6, 6, and said slots are in reality practically identical.

Figure 7:
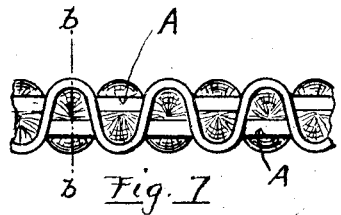
Fig. 7 is a side view of the macaroni produced by the use of my improved die in the form shown in Figures 1, 2 and 3 showing certain characteristic features of the same.

While, as has been above pointed out the central channel 4 is approximately of equal area with that of the cross slot 2, each of the die feeding apertures is, on the contrary, of relatively large area in comparison with the area of the longitudinal slot with which it communicates. Owing to these considerations the dough, in passing through my improved die, is controlled in the following manner so that it emerges from the die aperture in the characteristic form shown in side view by Fig. 7. In the formation of macaroni by the use of my die, the pressure exerted on the dough by the dough press, forces a portion of it into the channel 4, and after traversing the same it is discharged through the short cross slot and forms the central rib A of the product shown in Figs. 7 and 8. As a result of the same pressure, dough is also forced into the die feeding recesses 5, 5, whence it flows out, in part laterally through the passages 6, 6, to unite with the dough in the channel 4, and in part downwardly through said passages 6, 6, to be discharged through the arms of the longitudinal slot 2, by which terms I designate the portions thereof which lie on either side of the short cross-slot 3.

Owing to the large area of the die feeding recesses 5, 5, relative to the end portions, or arms, of the longitudinal slot 2, to which they supply dough, there is a tendency for the dough to emerge more freely from said arms than from said cross slot 3, to which it is supplied through the channel 4. In other words, the substantial equivalence of the area of the channel 4 and of the area of the cross-slot 3, to which it feeds the dough, produces in effect a drag upon the dough discharging through the cross slot 3 and forming the central rib A of the product, which causes a slowing up of the rate of discharge of the same as compared with the rate of discharge of the dough from the arms of the longitudinal slot. In consequence of their more rapid rate of discharge, the dough strips emerge from said end portions of slot 2 in the form of wing portions extending laterally from and lying in waving folds on each side of the relatively straight central rib A, which forms, as it were, the "back-bone" of the product.

Figure 4:
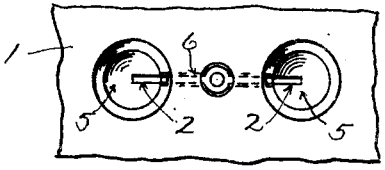
Figures 4, 5 and 6 are views analogous to those respectively shown in Figures 1, 2 and 3, but illustrating my invention in one of its modified forms.
Figure 2:
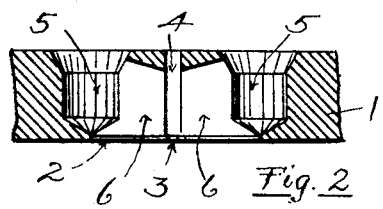
Fig. 2 is a sectional view of said die plate fragment on the central line $a$—$a$ of the die aperture, as shown in Fig. 1.
Figure 5:
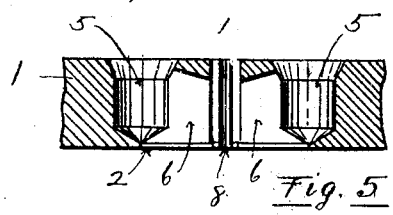
Figure 3:
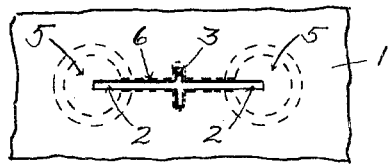
Fig. 3 is a plan view of said die plate fragment looking at the side from which the dough is expelled, and showing the die aperture.
Figure 6:
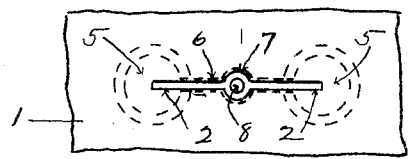
Figure 9:
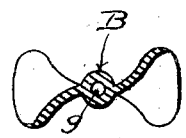
Fig. 9 is a similar sectional view of the macaroni produced by my dies in its modified form shown in Figures 4, 5 and 6.

In the modification of my invention shown in Figs. 4, 5 and 6, the cross-slot 3, of the die, is replaced by the preferably circular enlargement or opening 7 located substantially midway of the length of the longitudinal slot 2. This enlargement or opening 7 performs the same function as the short cross-slot 3 which is a part of the aperture presented by the die shown in Figs. 1, 2 and 3, in forming at the center of the macaroni product emerging from the die, the center rib B (see Fig. 9) of substantially cylindrical form; from which extends on either side the wing portions with waving folds formed by the end arms of the longitudinal slot. An end view of this type of product is illustrated in Figure 9. Further, by the use of a pin 8, secured in said die plate so that its end is centrally located in said circular enlargement 7, the said central rib B may be formed with an axial hollow bore 9 extending throughout its length and resulting in a formation of said central rib similar to the common type of tubular macaronis.

Figure 8:
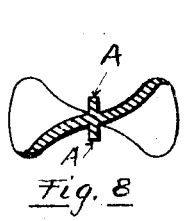
Fig. 8 is a sectional view of the same, on the line $b$—$b$, Fig. 7.
Figure 10:
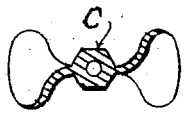
Figures 10 and 11 are similar sectional views of the macaroni product produced by further modified forms of my dies.
Figure 11:
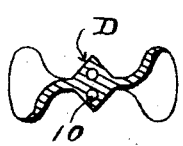

Figures 10 and 11 show, in sectional views analogous to those in Figs. 8 and 9, macaronis having the construction characteristic of the products of the dies which embody my invention, but embodying central ribs which differ in form from those shown in the figures hereinbefore described.

In Fig. 10, the central rib C is shown as being substantially hexagonal in form, instead of being in the circular form shown in Fig. 9. This modification is secured by the simple change of the outline of the central enlargement embodied in the die aperture shown in Fig. 6 from that of a substantially circular opening to one which is of a hexagonal outline. The change in the die is of such an obvious nature that it appears unnecessary to illustrate or describe in detail in this specification the specific form of the die calculated to produce this form of product.

In similar manner Fig. 11 shows a central rib D having the still further modification in form so that its cross section is of the shape of a lozenge, which is obtained by another corresponding modification in the form of the central enlargement of the die aperture. In this form of central rib, it is, moreover, of advantage to provide twin longitudinal bores 10, extending throughout the length of the rib, as may be shown in said Fig. 11.

Having described my invention what I claim and desire to secure by Letters Patent is:

1. In a die plate for use in manufacturing macaroni and the like, a die aperture consisting of a long slot and a short slot crossing the long slot midway of its length, a channel extending through said die plate to said short slot and being of substantially equal area therewith, a dough feeding recess located over each end of said long slot of relatively large area compared with said slot end, and passages leading from said dough feeding recess to said slot ends and also to said channel.

2. In a die plate for use in manufacturing macaroni and the like, a die aperture comprising a long and a short slot crossing each other substantially midway of their lengths, a channel substantially equal in area with said short slot extending through said die plate and terminating in said short slot, dough feeding recesses leading through said die plate, and passages leading from said recesses to said long slots and also to said channel, said dough feeding recesses and passages being of relatively large area as compared with the area of said slot.

3. A die for forming macaroni and the like consisting of a die plate having a dough discharging aperture comprising a longitudinal slot and an opening located midway of the length of said slot and constituting a lateral enlargement thereof, a channel substantially equal in area with said opening extending through said die plate and terminating in said opening, dough feeding recesses leading through said die plate and passages leading from said recesses to said longitudinal slot and also to said channel, said dough feeding recesses and passages being of relatively large areas as compared with the area of said slot.

4. A die for macaroni and the like, comprising a plate having a discharging aperture embodying a long slot, and a short slot crossing the same intermediate its length, a dough feeding channel extending through said plate leading to and adapted to discharge dough through said short slot, a dough feeding recess positioned over each end of said longitudinal slot and passages extending from each recess laterally to said channel and downwardly to said longitudinal slot.

5. A die for macaroni and the like, comprising a plate having a discharging aperture embodying a central opening, and a longitudinal slot of relatively narrow width compared with said opening extending in part on either side thereof, a dough feeding channel extending through said plate leading to said opening and adapted to discharge dough therethrough, a dough feeding recess positioned over each end of said longitudinal slot, and passages extending from each recess laterally to said channel and downwardly to said longitudinal slot.

MARIO TANZI.